United States Patent [19]
Coleman

[11] 3,952,509
[45] Apr. 27, 1976

[54] HYDRAULIC SYSTEM COMBINING OPEN CENTER AND CLOSED CENTER HYDRAULIC CIRCUITS

[75] Inventor: Martin W. Coleman, Independence, Mo.

[73] Assignee: Allis-Chalmers Corporation, Milwaukee, Wis.

[22] Filed: Apr. 10, 1975

[21] Appl. No.: 566,965

[52] U.S. Cl. .................................... 60/422; 60/445; 60/484; 60/DIG. 2
[51] Int. Cl.$^2$ ..................... F15B 11/16; F16H 39/46
[58] Field of Search ............. 60/422, 445, 459, 462, 60/465, 484, 487, DIG. 2

[56] References Cited

UNITED STATES PATENTS

| | | | |
|---|---|---|---|
| 2,643,515 | 6/1953 | Harsch | 60/DIG. 2 |
| 2,892,311 | 6/1959 | Vangerpen | 60/422 |
| 2,936,712 | 5/1960 | Vangerpen | 60/445 UX |

*Primary Examiner*—Edgar W. Geoghegan
*Attorney, Agent, or Firm*—Robert C. Sullivan

[57] ABSTRACT

A hydraulic system is provided in which a single variable displacement pump supplies the hydraulic fluid requirements of both an open center hydraulic circuit and a closed center hydraulic circuit. The hydraulic output from the variable displacement pump is delivered to a pressure compensated flow divider which at all times delivers a priority minimum and constant flow to the open center hydraulic circuit despite variations in pump output pressures. Unless there is a demand for hydraulic flow by a device or devices in the closed center hydraulic circuit, there is no hydraulic flow delivery from the flow divider to the closed center hydraulic circuit, and the variable displacement pump operates at relatively low power input required to supply the demands of the open center hydraulic circuit. Particularly when the only hydraulic demand on the pump is to satisfy the requirements of the open center hydraulic circuit in neutral position, the pump can operate on a "standby" basis at a relatively low output pressure, such as 300 pounds per square inch, with consequent low input power to the pump, and with relatively low "wear and tear" on the pump. The variable displacement pump assembly comprises a hydraulically actuated stroke control means including a tiltably adjustable swash plate, and a hydraulic compensator for controlling the tilt of the swash plate. A first pilot circuit is permanently connected between the open center hydraulic circuit and the control input point of the hydraulic compensator which controls the angular position of the tiltably adjustable swash plate, whereby the output pressure of the pump may respond to changes in hydraulic pressure requirements in the open center hydraulic circuit.

A second pilot circuit is connected at one of its ends to the hydraulic conduit which connects the flow divider to the closed center hydraulic circuitry, the opposite end of the second pilot circuit being connected to the control input point of the aforementioned compensator which controls the angular position of the tiltably adjustable swash plate. The second pilot circuit is completed to communicate a hydraulic input signal to the compensator from the closed center hydraulic circuit only in response to the actuation of at least one closed center device requiring hydraulic flow. Completion of the second pilot circuit as just mentioned will supersede the first pilot circuit whereby to cause the compensator to readjust the tiltably adjustable swash plate to cause the pump to supply the substantially higher hydraulic pressure requirements, such as 3,000 pounds per square inch, of the closed center hydraulic system.

16 Claims, 3 Drawing Figures

HYDRAULIC SYSTEM COMBINING OPEN CENTER AND CLOSED CENTER HYDRAULIC CIRCUITS

BACKGROUND OF THE INVENTION

1. Field of the Invention

This invention relates to hydraulic systems, and more particularly to a hydraulic system combining open center valve circuitry and closed center valve circuitry in a single system, and in which a priority hydraulic flow is insured for the circuit which includes the open center control valve. The hydraulic system of the invention may be used in a number of practical embodiments and will be described in the present application as embodied in a hydraulic control system for an agricultural apparatus such as a combine having a plurality of components which are hydraulically controlled.

2. Description of the Prior Art

By way of definition it might be explained that it is well known in the hydraulic control system art that an "open center" control valve is one which has a hydraulic fluid flow therethrough even when the open center control valve is in neutral position, and that such open center control valves have utility, for example, particularly in a system such as certain steering control systems for agricultural vehicles in which the steering system of the vehicle requires a priority minimal hydraulic fluid flow at all times through the control valve thereof even when the steering device is not being actuated for a turning movement.

By way of definition it is also well known in the prior art that a "closed center valve system" is a hydraulic control system in which there is no hydraulic flow through the control valve when the control valve is in its neutral position.

It has been known in the prior art relating to hydraulic control systems for large agricultural machines such as combines which have a plurality of hydraulically operated components to provide two separate pumps for supplying the hydraulic fluid to the various hydraulically operated components and to the hydraulic control circuits thereof. One pump, for example, may be used to provide hydraulic flow to an open center spool valve bank which provides (1) header lift control; (2) reel lift control; (3) reel speed control; (4) ground speed control. In the prior art a separate pump is usually provided for the hydraulic requirements of the steering system of such agricultural vehicles.

The use of multiple pumps to perform the plurality of hydraulic functions associated, for example, with large agricultural apparatus such as a combine, is expensive, and the open center hydraulic control systems with which such multiple pumps are usually associated waste power since as previously explained an open center hydraulic control system inherently includes a hydraulic flow through the valve system even when the valve is in a neutral position.

STATEMENT OF THE INVENTION

Accordingly, it is an object of the present invention to provide a hydraulic system in which a single relatively large capacity pump provides hydraulic flow and pressure necessary to perform a selected hydraulic function at any given time but which allows the pump to stand by at very low horsepower when only minimal hydraulic flow is required, thus substantially saving power consumption by the pump, and reducing "wear and tear" on the pump.

It is a further object of the present invention to provide a hydraulic system combining in a single system an open center priority flow hydraulic circuit and a closed center hydraulic system.

It is a further object of the invention to provide a hydraulic system including an open center priority flow hydraulic circuit in combination with and using the same pump and hydraulic fluid supply as a cooperating closed center hydraulic circuit system, and in which the common hydraulic fluid supply for the open center hydraulic circuit and for the closed center hydraulic circuit can be subjected to a common filtration and cooling action in contrast to most prior art closed center hydraulic systems which usually do not have constant circulating hydraulic fluid available for filtration or cooling.

It is a further object of the invention to provide a hydraulic system including a variable displacement pump which can be operated in a "standby mode" at a relatively low output hydraulic pressure (such as 300 pounds per square inch, for example) to supply only the constant priority flow requirements to an open center circuit in neutral position (such as a steering control circuit); together with suitable control means for varying the displacement of the pump in response to a flow demand from a closed center hydraulic circuit also supplied by the same pump to provide a pump output at a substantially higher hydraulic pressure (such as 3,000 pounds per square inch, for example) than the pump output pressure when in "standby mode."

It is a further object of the invention to provide a hydraulic system which has particular utility for use with agricultural machines, such as combines, for example, in which the priority flow of the hydraulic fluid, such as oil, in the open center hydraulic circuit portion of the system may be used in connection with the operation of the steering mechanism of the vehicle, thereby providing an always available priority hydraulic flow to the steering system, and in which the closed center portions of the hydraulic system may be used for the hydraulic operation and control, for example of such components used on an agricultural combine machine as, for example, the header lift, the reel lift, the reel speed control, the ground speed control, the bin unloader position control, (auger control), and the hillside combine leveling.

SUMMARY OF THE INVENTION

In achievement of these objectives, there is provided in accordance with an embodiment of the invention a hydraulic system in which a single variable displacement pump supplies the hydraulic fluid requirements of both an open center hydraulic circuit and a closed center hydraulic circuit. The hydraulic output from the variable displacement pump is delivered to a pressure compensated flow divider which at all times delivers a priority minimum and constant flow to the open center hydraulic circuit despite variations in pump output pressures. Unless there is a demand for hydraulic flow by a device or devices in the closed center hydraulic circuit, there is no hydraulic flow delivery from the flow divider to the closed center hydraulic circuit, and the variable displacement pump operates at relatively low power input required to supply the demands of the open center hydraulic circuit. Particularly, when the only hydraulic demand on the pump is to satisfy the requirements of the open center hydraulic circuit in neutral position, the pump can operate on a "standby" basis at a relatively low output pressure, such as 300 pounds per square inch, with consequent low input power to the pump, and with relatively low "wear and tear" on the pump. The variable displacement pump assembly comprises a hydraulically actuated stroke control means including a tiltably adjustable swash plate and a hydraulic compensator for controlling the tilt of the swash plate. A first pilot circuit is permanently connected between the open center hydraulic circuit and the control input point of the hydraulic compensator which controls the angular position of the tiltably adjustable swash plate, whereby the output pressure of the pump may respond to changes in hydraulic pressure requirements in the open center hydraulic circuit.

A second pilot circuit is connected at one of its ends to the hydraulic conduit which connects the flow divider to the closed center hydraulic circuitry, the opposite end of the second pilot circuit being connected to the control input point of the aforementioned compensator which controls the angular position of the tiltably adjustable swash plate. The second pilot circuit is completed to communicate a hydraulic input signal to the compensator from the closed center hydraulic circuit only in response to the actuation of at least one closed center device requiring hydraulic flow. Completion of the second pilot circuit as just mentioned will supersede the first pilot circuit, whereby to cause the compensator to readjust the tiltably adjustable swash plate to cause the pump to supply the substantially higher hydraulic pressure requirements, such as 3,000 pounds per square inch, of the closed center hydraulic system.

BRIEF DESCRIPTION OF THE DRAWINGS

Further objects and advantages of the invention will become apparent from the following description taken in conjunction with the accompanying drawings in which.

DESCRIPTION OF THE PREFERRED EMBODIMENT

Figure 1:
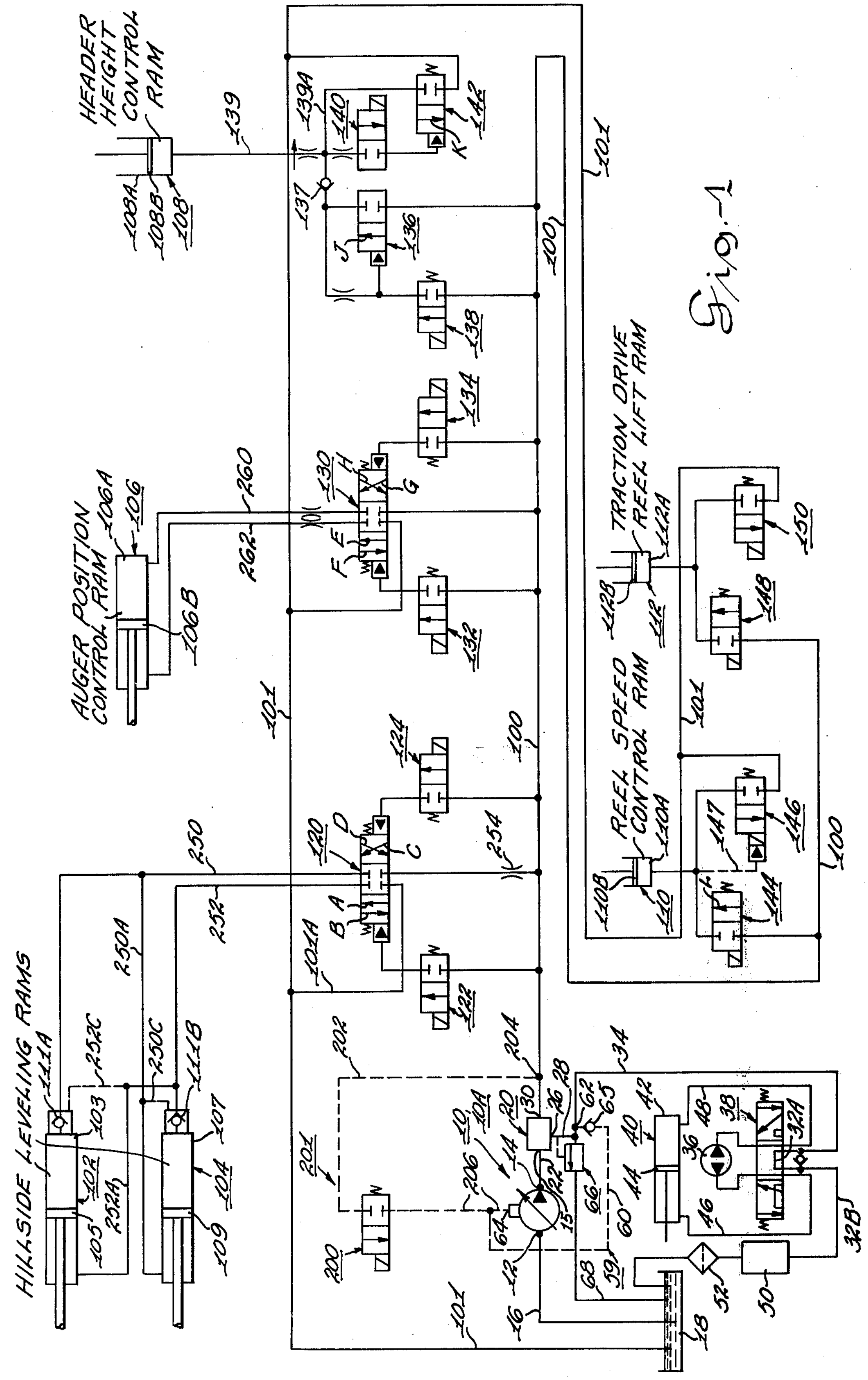
FIG. 1 is a schematic diagram of the hydraulic system of the invention embodying an open center hydraulic circuit and additionally embodying closed center hydraulic circuitry, with both the open center hydraulic circuit and the closed center hydraulic circuit being supplied with hydraulic fluid from a common pump.
Figure 2:
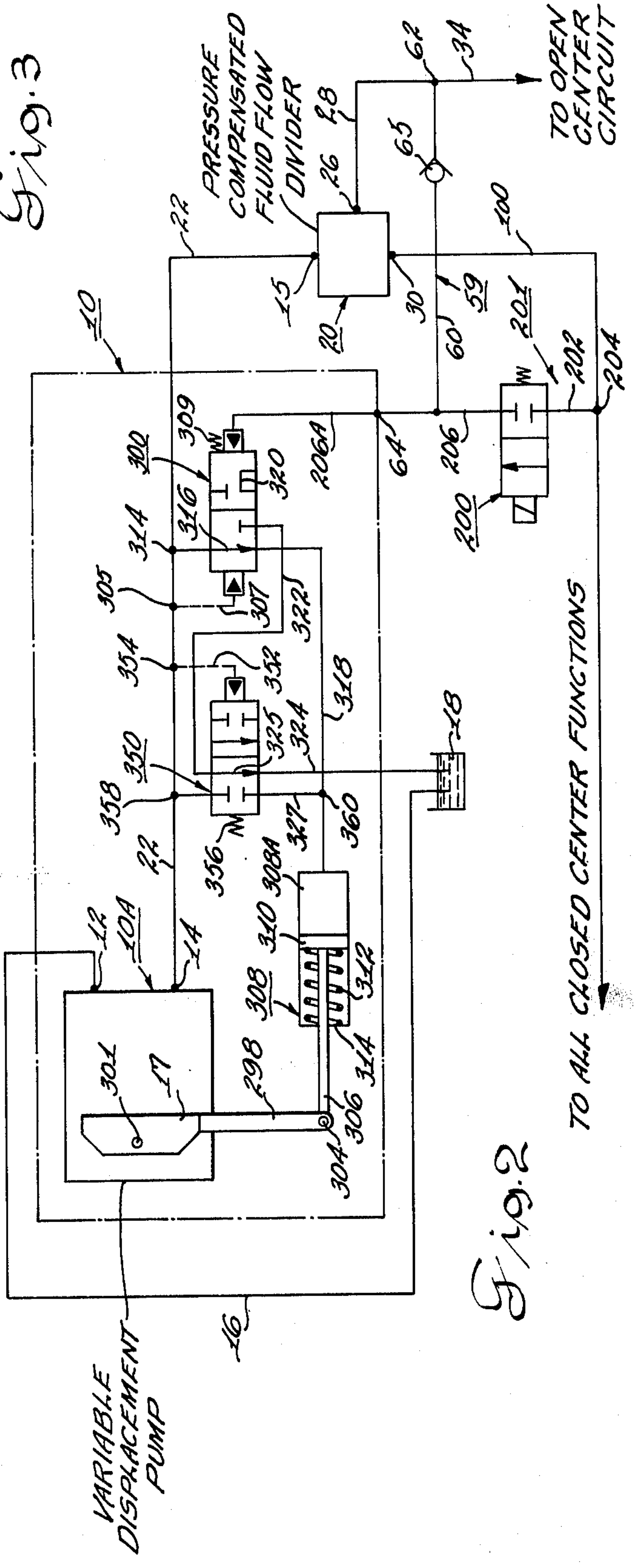
FIG. 2 is a detailed schematic view of the variable displacement pump and compensator assembly 10.

General Description of Variable Displacement Pump and Its Relation To Open Center Hydraulic Circuit and Closed Center Hydraulic Circuit Referring now to the drawings, and more particularly to FIGS. 1 and 2, there is shown a variable displacement pump and compensator assembly generally indicated at 10, enclosed within the boundaries of the dot-dash lines of FIG. 2. The assembly 10 includes variable displacement pump 10A (FIG. 2) and also includes a compensator for regulating the output of pump 10A, which compensator will be described in more detail in connection with the detailed description of FIG. 2. The assembly 10 may be of the type manufactured by the Cessna Aircraft Company, Hutchinson, Kansas, under Model No. 70421. Pump 10A is rotatably driven by a suitable prime mover (not shown). If the hydraulic system is used on agricultural equipment such as a combine, the pump 10A may be driven by a power take-off from the engine which drives the combine. The variable displacement pump 10A comprises a plurality, such as nine, axially reciprocable pistons whose axial displacement may be varied to vary the hydraulic flow and pressure output of pump 10A. Pump 10A includes a tiltable swash plate 17 (FIG. 2). As will be explained hereinafter in more detail, swash plate 17 is tiltably movable under the influence of the compensator forming part of assembly 10 to vary the axial displacement of the reciprocable pistons of pump 10A and hence to vary the output flow and pressure of the variable displacement pump 10A. Variable displacement pumps of this general type are well known in the art. Pump 10A includes an input port 12 and an outlet port 14. Inlet port 12 of pump 10A is connected through conduit 16 to sump 18 which serves as a source of the hydraulic liquid supply. Outlet port 14 of pump 10A is connected via conduit 22 to inlet port 15 of a pressure compensated flow divider generally indicated at 20. Pressure compensated flow dividers per se are well known in the art, and are commercially available. A pressure compensated flow divider suitable for use in the present hydraulic system is manufactured and sold by Control Concepts, Inc., Newton, Pennsylvania. A "pressure compensated" flow divider is a hydraulic flow divider which delivers through an outlet port thereof a priority hydraulic flow of constant flow rate despite variations in the pump hydraulic pressure applied to the input of the flow divider. To simplify the terminology hereinafter in the specification, the "pressure compensated" flow divider 20 will be referred to merely as "flow divider" 20.

Flow divider 20 includes a first outlet port 26 which is connected by outlet conduit 28 to conduit 34 which supplies the open center hydraulic circuit. Flow divider 20 also includes a second outlet port 30 to which is connected a flow divider output conduit generally indicated at 100 which supplies hydraulic fluid to the "closed center" hydraulic circuitry as will be explained hereinafter in more detail.

As is well known in the art of pressure compensated flow dividers, the flow dividers 20 may be so adjusted or constructed as to provide a priority flow of a predetermined minimum value, such as for example, 3.5 gallons per minute flow, through flow divider first outlet port 26 and through connecting conduit 28 to conduit 34 to the open center hydraulic circuit. By "priority flow" such as that supplied through first outlet port 26 of flow divider 20 is meant a constant magnitude hydraulic flow which is available at all times and under varying output pressures of pump 10A, in this instance the priority flow going to the open center hydraulic circuit, as long as the pump 10A is in operation, and which takes priority over the hydraulic flow requirments of the "closed center" hydraulic circuitry which is supplied through flow divider output conduit 100.

The priority hydraulic flow such as 3.5 gallons per minute, for example, which constantly flows from outlet port 26 of flow divider 20 enters conduit 34 of the open center hydraulic circuit which, in the particular instance illustrated in FIG. 1, is used for supplying hydraulic fluid to the steering control circuit for an agricultural machine, such as a combine.

DESCRIPTION OF OPEN CENTER CONTROL CIRCUITRY

As diagramatically shown in FIG. 1, the steering control circuit which embodies the open center control valve includes a steering wheel operated pump 36, a linearly movable open center control valve generally indicated at 38 and shown in its neutral position in the view of FIG. 1, and a hydraulic ram generally indicated at 40 including a cylinder 42 and a piston 44 which is linearly movable within the cylinder 42 as hydraulic fluid is admitted to or exhausted from one or the other of the opposite ends of the ram cylinder 42 through conduits 46 and 48, respectively, under the control of steering wheel operated pump 36. Linearly movable piston 44 is suitably mechanically connected to the steering linkage in a manner well known in the art, whereby linear movement of piston 44 in one direction causes steering movement of the vehicle in a given direction and linear movement of piston 44 in the other direction causes steering movement of the vehicle in the opposite direction.

Conduit 34 which is connected to outlet port 26 of flow divider 20 as previously mentioned, has a constant priority flow therethrough such as 3.5 gallons per minute. In the illustrated schematic view shown in FIG. 1, the steering circuit is assumed to be in neutral position in which no turning movement of the steering mechanism is taking place. In this situation, the priority hydraulic flow through conduit 34 flows continuously through the open center (closed flow path) portion 32A of open center valve 38, thence passes through flow passage 32B in series with a heat exchanger or cooling device 50, thence through the filtering device 52, the cooled and filtered hydraulic fluid, such as oil, then returning to sump 18.

If it is desired to impart a steering movement to the wheels of the agricultural machine such as a combine, the steering wheel is rotated and thereby pump 36 is rotated in the desired direction and in so doing, through the cooperation of open center valve 38 which forms part of the steering hydraulic control circuit, causes admission of hydraulic fluid to one end of cylinder 42 of steering ram 40 and exhaust of hydraulic fluid through the opposite end of cylinder 42, depending upon which direction the steering wheel is rotated.

Regardless of whether or not the steering wheel is in a neutral position or is being rotated to impart a steering movement to the agricultural vehicle, the same priority constant magnitude minimal flow of hydraulic liquid, such as 3.5 gallons per minute, passes from outlet port 26 of fluid flow divider 20, and into conduit 34 which supplies the open center hydraulic circuit used in conjunction with the steering mechanism. However, when the steering wheel is rotated to impart a steering movement to the steering mechanism, to thereby cause the admission of hydraulic fluid into one or the other end of steering ram 40, the hydraulic pressure in hydraulic conduit 34 increases from the pressure which prevails in hydraulic conduit 34 and the associated open center hydraulic circuit when the steering mechanism is in neutral position.

In this connection, and for the purpose of sensing the hydraulic pressure in the open center hydraulic circuit (in this case, the steering control circuit), a first pilot circuit generally indicated at 59, is provided which is responsive to the pressure in the open center hydraulic circuit and more specifically to the pressure in the hydraulic conduit 34. This first pilot circuit includes a pilot conduit 60 (FIGS. 1 and 2) connected to conduit 34 at a junction 62 closely adjacent the location at which outlet port 26 of flow divider 20 is connected by connecting conduit 28 to conduit 34 of the open center hydraulic circuit. The opposite end of pilot conduit 60 is connected via control conduit 206 to the input control point 64 of variable displacement pump and compensator assembly 10. A one-way ball check valve 65 (FIGS. 1 and 2) is connected in series with pilot conduit 60 closely adjacent junction 62 where pilot conduit 60 is hydraulically connected to conduit 34 of the open center hydraulic circuit. The use of one-way check valve 65 prevents reverse flow into the hereinbefore described open center hydraulic circuit used in conjunction with the steering system in the illustrated example, from the higher hydraulic pressure which may prevail in the closed center hydraulic circuitry to be hereinafter described.

Thus, pilot conduit 60 communicates the pressure in conduit 34, which forms part of the open center hydraulic circuitry, to input control point 64 of the variable displacement pump and compensator assembly 10. If the pilot circuit comprising the pilot conduit 60 senses an increased pressure in conduit 34 due to the fact that the steering wheel controlling pump 36 of the steering mechanism is being rotated to impart a steering action to the agricultural machine or the like, this increased pressure communicated through pilot conduit 60 and communicated to input control point 64 of assembly 10 as just explained, will cause a readjustment of the angular position of the tiltable swash plate 17 (FIG. 2) of the variable displacement pump 10A to accommodate the increased pressure requirements of the open center hydraulic circuit used in the steering system. However, as previously pointed out, although the position of the tiltable swash plate 17 is readjusted to accommodate the increased pressure requirements of the open center steering system as just described, the quantity of hydraulic fluid delivered by pressure compensated flow divider 20 to the open center hydraulic circuitry of the steering system remains unchanged and in the example given would still remain at 3.5 gallons per minute flow of hydraulic liquid to the open center hydraulic circuit independently of whether the steering wheel is in neutral position, or whether the steering wheel is being rotated to impart a steering action, through steering ram 40, to the wheels of the agricultural vehicle or the like.

It is desirable to maintain a substantially lower pressure in the open center hydraulic circuit which has been hereinbefore described than in the closed center hydraulic circuitry which has yet to be described. For this reason, a relief valve generally indicated at 66 (FIG. 1) is provided and may be set at a relief value, such as, for example, 2,000 pounds per square inch. The relief valve 66 has means for sensing the hydraulic pressure in outlet conduit 28 of fluid divider 20 which leads to conduit 34 of the open center hydraulic circuit. When the pressure sensed in conduit 28 and thus in the open center hydraulic circuit reaches a set predetermined value such as 2,000 pounds per square inch, for example, relief valve 66 will open and will discharge the priority output flow passing from flow divider 20 through conduit 28 (FIG. 1) through relief valve 66 and thence through conduit 68 to sump 18. Relief valve 66 therefor protects the open center hydraulic circuit and the steering system associated therewith against predetermined overpressure conditions, such as hydraulic pressures in excess of 2,000 pounds per square inch.

GENERAL DESCRIPTION OF CLOSED CENTER HYDRAULIC CIRCUITRY

As has been previously mentioned, the fluid flow divider 20 has an outlet port 30 which is hydraulically connected to the closed center hydraulic circuitry by way of the flow divider output conduit 100.

The closed center hydraulic circuitry diagrammatically illustrated in FIG. 1 is shown as being employed for hydraulically controlling and actuating various components used in connection with an agricultural machine such as a combine. Thus, for example, two cooperating hillside leveling rams respectively generally indicated at 102 and 104 are controlled by a closed center hydraulic controlled circuitry to be hereinafter described; an auger position control ram generally indicated at 106 is controlled by closed center hydraulic circuitry to be hereinafter described; a header height control ram generally indicated at 108 is controlled by closed center hydraulic circuitry to be hereinafter described; a reel speed control ram generally indicated at 110 is controlled by closed center hydraulic circuitry to be hereinafter described; and a traction drive reel lift ram generally indicated at 112 is controlled by closed center hydraulic circuitry to be hereinafter described.

Under the conditions previously described in which it was assumed that there was no demand for hydraulic fluid in the "closed center" part of the hydraulic system, the only hydraulic control signal fed to the control input point 64 of variable displacement pump and compensator assembly 10 is that supplied through the first pilot circuit 59 including pilot conduit 60 which senses the pressure condition in conduit 34 associated with the open center hydraulic circuit. Under these conditions, the only hydraulic flow from variable displacment pump 10A and flow divider 20 is the priority flow delivered via conduit 34 to the open center hydraulic circuit used for the steering control. Under the conditions just described, variable displacement pump 10A is operating at a relatively low level of power consumption, particularly if the open center hydraulic circuit is in neutral position or "standby" mode of operation.

Assume now that one of the hydraulic devices associated with the closed center hydraulic circuitry is to be actuated in such manner as to demand a flow of hydraulic liquid in the flow divider output conduit 100 from flow divider 20.

It will be noted that a second pilot circuit generally indicated at 201 in FIG. 1 is provided which is responsive to conditions in the closed center hydraulic circuitry. This second pilot circuit 201 includes a solenoid valve generally indicated at 200. Solenoid valve 200 is connected by pilot line 202 to the junction 204 in the flow divider output conduit 100 closely adjacent the connection of conduit 100 to outlet port 30 of flow divider 20. As previously mentioned, flow divider output conduit 100 delivers hydraulic fluid from flow divider 20 to the closed center circuitry. Solenoid valve 200 of the second pilot circuit 201 is connected by control conduit 206 in hydraulic fluid conducting relation to control input point 64 of the variable displacement pump and compensator assembly 10 when solenoid valve 200 is electrically energized to "open" position (i.e., hydraulic fluid conducting position). When a hydraulic control signal is applied from the closed center hydraulic circuitry by way of line 206 to the input control point 64 of variable displacement pump and compensator assembly 10, the tiltably adjustable swash plate 17 associated with variable displacement pump 10A will be readjusted in such manner as to readjust the pressure output of pump 10 to some higher figure, such as 3,000 psi (pounds per square inch), required for operation in the closed center hydraulic circuitry portion of the hydraulic system.

The manner in which the angular position of swash plate 17 is readjusted in response to hydraulic control signals applied to control input point 64 of assembly 10 from either the open center hydraulic circuit or from the closed center hydraulic circuit will be described more fully in connection with a description of the schematic diagram of FIG. 2 which schematically shows the variable displacement pump and compensator assembly 10.

Figure 3:
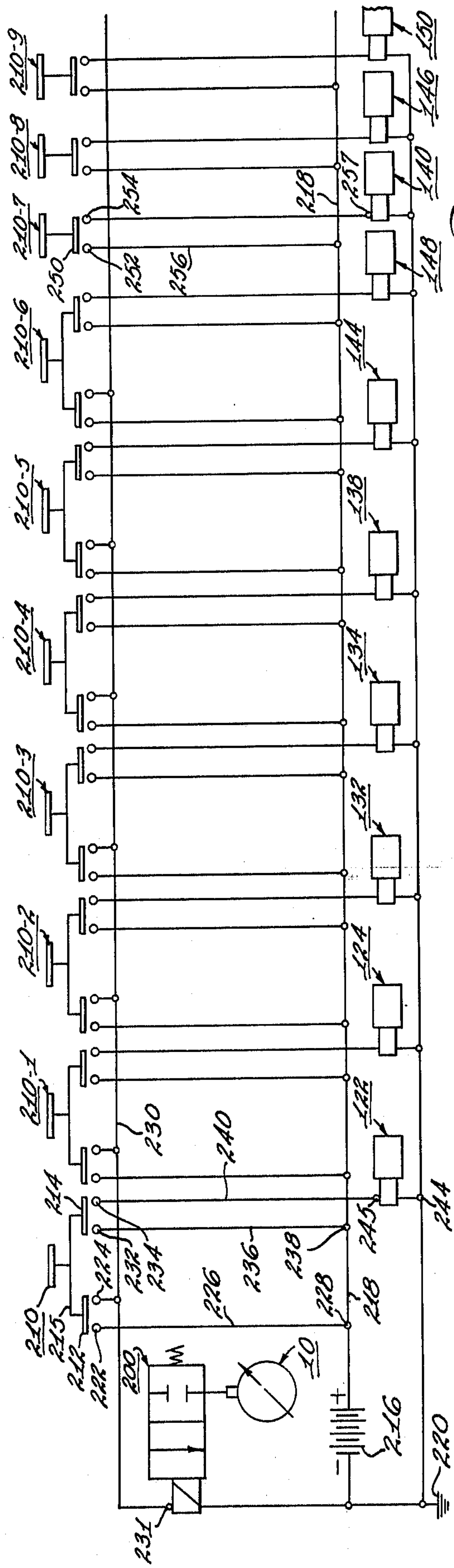
FIG. 3 is a schematic electrical wiring diagram of the control circuitry of FIG. 1.

Referring now to the schematic wiring diagram of FIG. 3, it will be noted that when any one of the electrical solenoid valve devices 122, 124, 132, 134, 138, 144 and 148 of the closed center hydraulic circuitry is energized, and electrical circuit is completed which will electrically energize solenoid valve 200 of second pilot circuit 201 to its "open" position. In its "open" position, solenoid valve 200 is so positioned that hydraulic fluid pressure is communicated from hydraulic output line 100 of flow divider 20, at junction 204, thence through pilot conduit 202 to the input of solenoid valve 200, thence through solenoid valve 200 in its "open" position to which it has been moved by energization of the solenoid valve 200 (valve 200 is shown in its closed or non-flow conducting position in the view of FIG. 1), the hydraulic flow thence passing through pilot conduit 206 into the hydraulic control signal input point 64 of assembly 10 in such manner as to readjust the position of tiltable swash plate 17 which forms part of pump 10A, to a position in which the hydraulic pressure output line 22 is at a substantially increased pressure, such as 3,000 pounds per square inch, for utilization in the "closed center" hydraulic circuitry. This increased pressure, such as 3,000 pounds per square inch, appears at outlet port 30 of flow divider 20 and in flow divider output conduit 100 which supplies the closed center hydraulic circuitry.

DESCRIPTION OF ELECTRICAL CIRCUITRY ASSOCIATED WITH CLOSED CENTER HYDRAULIC CIRCUITRY

The manner in which solenoid valve 200 of the second pilot circuit 201 for pump and compensator assembly 10 is electrically energized to move to its "open" (i.e. - open to fluid flow therethrough) position will described in connection with the energization of one of the solenoid valves 122 in the closed center hydraulic circuitry, it being understood that energization of any one of the other solenoid valves 124, 132, 134, 138, 144 and 148 will serve to energize solenoid valve 200 to its "open" position in the same manner. Thus, referring to FIG. 3, it will be noted that a push button switch generally indicated at 210 is associated with the electrical circuitry of solenoid valve 122. Solenoid valve 122, as seen in FIG. 1, is associated with the hydraulic control of hillside leveling rams 102 and 104. Push button switch 210 is a double pole switch and includes poles 212 and 214 which are carried by an electrical insulating arm 215 forming part of switch 210.

A direct current power supply in the form of an electric battery generally indicated at 216 is provided, and the positive terminal of the battery is connected to an output electrical bus 218. The negative terminal of battery 216 is grounded as indicated at 220. Pole 212 of push button switch 210 cooperates with a pair of fixed contacts 222 and 224. Contact 222 is connected by electrical lead 226 to junction 228 of bus 218, and thus contact 222 is connected to the positive terminal of battery 216. Contact 224 which also cooperates with pole 212 of switch 210 is connected to an electrical bus 230 which is electrically connected to terminal 231 of solenoid valve 200. Pole 214 of the same push button switch 210 cooperates with a pair of fixed contacts 232 and 234, respectively. Fixed contact 232 is connected by electrical lead 236 to junction 238 of conductor or bus 218 leading to the positive terminal of battery 216, and fixed contact 234 is connected by electrical lead 240 to electrical terminal 245 of solenoid valve 122. The other electrical terminal of solenoid valve 122 is grounded as indicated at 244.

It can be seen in FIG. 3 that when push button switch 210 is actuated to closed position, pole 212 of switch 210 will bridge fixed contacts 222 and 224, and pole 214 will bridge fixed contacts 232 and 234. The connecting bar 215 between poles 212 and 214, as has been explained, is of electrical insulating material. Bridging of fixed contacts 222 and 224 will complete an electrical circuit from the positive terminal of battery 216 to terminal 231 of solenoid valve 200, and since the other terminal of solenoid valve 200 is grounded at 220, solenoid valve 200 is thereby energized and moved to its open position. Simultaneously, the bridging of contacts 232 and 234 by pole 214 of switch 210 will connect terminal 245 of solenoid valve 122 to the positive terminal of battery 216; and since the other terminal of solenoid valve 122 is connected to ground as indicated at 244, the bridging of contacts 232 and 234 as just described will thereby energize solenoid valve 122 associated with the hydraulic control circuit of hillside leveling rams 102 and 104.

As described more fully in connection with FIGS. 1 and 2, the energization of solenoid valve 200 as just described by the closure of push button switch 210 will move solenoid valve 200 to its "open" position in which a hydraulic signal is applied through the second pilot circuit 201 from the closed center hydraulic circuitry. As best seen in FIGS. 1 and 2, the second pilot circuit 201 extends from junction 204 of flow divider output conduit 100 which supplies hydraulic flow to the closed center circuitry, through pilot line 202, through solenoid valve 200 and pilot line or conduit 206 to input control point 64 of variable displacement pump and compensator assembly 10. The connection of the hydraulic signal input from the second pilot circuit 201 to the input control point 64 of variable displacement pump and compensator assembly 10 as just described will cause a readjustment of tiltable swash plate 17 (FIG. 2) of pump 10A to readjust the output pressure at port 30 of flow divider 20 and hence in the flow divider output line 100 to a substantially higher value such as 3,000 p.s.i., as is required for proper operation of the various closed center control and hydraulic devices associated with the closed center hydraulic circuitry.

Referring again to FIG. 3, while the energization of solenoid valve 200 by actuation of push button switch 210 associated with solenoid valve 122 of the hillside leveling control has been described as illustrative of the manner in which solenoid valve 200 is energized to connect the second pilot circuit 201 into input control point 64 of variable displacement pump and compensator assembly 10, it will be understood that actuation of any of the other push button switches such as 210-1, 210-2, 210-3, 210-4, 210-5 and 210-6 associated with the respective solenoid valves 124, 132, 134, 138, 144 and 148, as seen in FIG. 3 will also be effective to simultaneously energize solenoid valve 200 in the same manner as just described in connection with the operation of push button switch 210, actuation of any of these other push button switches just enumerated acting in a similar manner to energize its corresponding solenoid valve, such as 124, 132, etc., and to simultaneously energize solenoid valve 200 associated with second pilot circuit 201.

However, assume that a plurality of the various hydraulic devices associated with the closed center hydraulic circuit are in use and that it has been necessary to actuate a plurality of the push button switches such as 210, 210-1, 210-2, 210-3, etc. The operation of a plurality of such devices on the closed center side of the hydraulic system will, of course, demand a larger hydraulic flow in the output conduit 100 connected to output port 30 of flow divider 20. As additional closed center hydraulic devices are placed in use, and as the flow in output conduct 100 increases, the hydraulic control signal applied through second pilot circuit 201 including solenoid valve 200, to control input point 64 of variable displacement pump and compensator assembly 10 will vary somewhat as increased hydraulic flow occurs in the flow divider output line 100. The second pilot circuit 201 including the solenoid valve 200 will vary the input hydraulic signal to control point 64 of variable displacement pump and compensator assembly 10, whereby to readjust the position of swash plate 17 (FIG. 2), sufficiently to maintain a substantially constant pump output pressure, such as 3000 lbs. per square inch, while supplying the increased hydraulic flow demand to the increased number of closed center hydraulic devices in use.

As seen in the electrical wiring schematic of FIG. 3, solenoid 140 which controls the descending mode of operation of header height control ram 108 is controlled by a push button switch generally indicated at 210-7 having a single pole 250. When push button switch 210-7 is actuated, it bridges fixed contacts 252 and 254. Fixed contact 252 is connected by electrical lead 256 to electrical bus 218 leading to the positive terminal of electrical battery 216. Fixed contact 254 is connected to input terminal 257 of solenoid valve 140. The opposite terminal of solenoid valve 140 is grounded. It can be seen that when push button switch 210-7 is actuated to bridge fixed contacts 252 and 254, solenoid valve 140 is energized to permit the exhaust of hydraulic fluid from cylinder 108A of header height control ram 108 to sump line 101 (FIG. 1) through the associated hydraulic control valve 142. It will be noted that actuation of push button 210-7 to energize solenoid valve 140 does not simultaneously energize solenoid valve 200 in the second pilot circuit 201 as in the case of the double pole push button switches 210, 210-1, etc., previously described, since solenoid valve 140 energized by push button switch 210-7 does not through its actuation provide a hydraulic connection to flow divider output conduit 100, as in the case of the previously discussed push button switches 210, 210-1, etc., but instead provides a hydraulic connection, through associated valve 142, to sump line 101.

Also, as seen in the electrical schematic wiring diagram of FIG. 3, solenoid valve 146 which controls the descending mode of operation of reel speed control ram 110 is energized by a single pole push button switch generally indicated at 210-8 in the same manner as explained in connection with the energization of solenoid valve 140. As previously explained in connection with push button switch 210-7 and solenoid valve 140 which it controls, the energization of push button switch 210-8 does not simultaneously energize solenoid valve 200 of the second pilot circuit, since actuation of push button switch 210-8 to energize solenoid valve 146 does not establish a hydraulic connection to flow divider output conduit 100, but instead hydraulically connects cylinder 110A of reel speed control ram 110 to sump line 101.

Solenoid valve 146 associated with the descending mode of operation of reel speed control ram 110 may also be moved to its open position by the application of hydraulic force through hydraulic pilot line 147 (FIG. 1) which is responsive to the hydraulic pressure inside cylinder 110A of ram 110. When a predetermined hydraulic pressure is sensed in pilot line 147, solenoid valve 146 will be moved to the right relative to the view of FIG. 1 to thereby connect to sump line 101 the interior of ram cylinder 110A beneath piston 110B.

Also, as seen in the electrical wiring schematic of FIG. 3, solenoid valve 150 which controls the descending mode of operation of the traction drive reel lift ram 112 is energized by a single pole push button switch generally indicated at 210-9 in the same manner as just described in connection with the energization of solenoid valves 140 and 146. As previously explained in connection with solenoid valves 140 and 146, the actuation of push button switch 210-9 to energize solenoid valve 150 does not simultaneously energize solenoid valve 200 of the second pilot circuit, since the actuation of push button switch 210-9 to energize solenoid valve 150 does not establish a hydraulic connection to flow divider output conduit 100, but instead hydraulically connects cylinder 112A of traction drive reel lift ram 112 to sump line 101 (see FIG. 1).

As previously explained, energization of any one of the solenoid valves 122, 124, 132, 134, 138, 144, 148 (FIG. 1) by actuation of its corresponding push button switch 210, 210-1, 210-2, etc., will simultaneously energize solenoid valve 200 to cause the output hydraulic pressure of pump 10A to increase to 3,000 pounds per square inch, this same pressure, as previously explained being then available in flow divider output conduit 100. Assuming, for example, that only a single solenoid valve 132 is energized at a particular moment being considered by actuation of its corresponding push button switch 210-2 (FIG. 1), the piston 106B of the associated ram 106 will be moved to the predetermined desired position in cylinder 106A by high pressure hydraulic fluid from conduit 100 passing through solenoid valve 132 and associated control valve 130, as will be explained in more detail hereinafter. When piston 106B has been hydraulically moved to the predetermined desired position, push button 210-2 is released to deenergize solenoid valve 132 and to simultaneously deenergize solenoid valve 200. Deenergization of solenoid valve 200 will open the second pilot control circuit 201, previously discussed, and will cause the first pilot circuit 59 which monitors the pressure condition of the open center hydraulic circuit to again resume control.

All of the solenoid valves and control valves of the closed center hydraulic system shown in FIG. 1 are spring-biased to a neutral position in which they do not normally conduct hydraulic fluid therethrough. Consequently, in the example just discussed, when solenoid valve 132 is deenergized by opening of its corresponding push button switch 210-2 (FIG. 3), both solenoid valve 132 and its associated control valve 130 will be returned by their corresponding biasing springs to neutral position, and the hydraulic fluid which has flowed in cylinder 106A of ram 106 will be trapped in cylinder 106A, maintaining piston 106B at the predetermined desired position to which it had been moved.

It will be understood that the description just given of solenoid valve 132, control valve 130, and ram 106 is typical of the operation of the solenoid valves 122, 124, 132, 134, 138, 144, 148 (FIG. 1), and of the respective rams with which they are associated.

As a practical matter, the time required for the movement of any of the pistons of the various ram devices shown in FIG. 1 to a desired position by the high pressure output of pump 10A when solenoid 200 is energized is generally only a matter of a few seconds, and when such movement has been accomplished, solenoid 200 is deenergized by release of the corresponding push button switch, and the control of pump-compensator assembly 10 reverts to control by pilot circuit 59 which monitors the pressure condition of the open center hydraulic circuit. Thus, for a large percentage of the duty cycle of the pump 10A, it is under control of the first pilot circuit 59, with pump 10A consequently operating at substantially lower pressure, lower power input, and less "wear and tear" than when under control of the second pilot control circuit 201.

DETAILED SCHEMATIC DESCRIPTION OF VARIABLE DISPLACEMENT PUMP AND COMPENSATOR ASSEMBLY 10

There is shown in FIG. 2 a more detailed schematic diagram of the variable displacement pump and compensator assembly 10. The assembly 10 is enclosed within the boundaries of the dot-dash lines of FIG. 2. As previously mentioned, the assembly 10 may be of the type manufactured by the Cessna Aircraft Company, Hutchinson, Kansas, under Model No. 70421. The variable displacement pump 10A is of a general type well known in the art and comprises a plurality, such as nine, axially reciprocable pistons whose axial displacement may be varied by engagement with a tiltably movable swash plate 17 to thus vary the hydraulic fluid and pressure output of the pump. Pump 10A may be rotatably driven by any suitable prime mover, and if pump 10A is mounted on an agricultural vehicle such as a combine, it may be driven by a power take-off from the engine which drives the combine.

Variable displacement pump 10A includes an inlet port 12 which is connected by means of conduit 16 to a source of hydraulic fluid supply in sump 18. Pump 10A includes an output port 14 which is connected by means of output conduit 22 to inlet port 15 of the pressure compensated flow divider generally indicated at 20 which lies external of pump-compensator assembly 10. Flow divider 20 includes an outlet port 26 which is connected via conduits 28 and 34 to deliver a constant priority flow such as 3.5 gallons per minute from flow divider 20 to the open center hydraulic circuit, as previously described, despite variations in the input hydraulic pressure from pump 10A to flow divider 20. Flow divider 20 also includes a second outlet port 30 which delivers hydraulic fluid output from pump 10A to flow divider output line 100 to which the various closed center hydraulic devices are connected as best seen in the general schematic view of FIG. 1.

Variable displacement pump 10A is provided with a tiltably movable swash plate 17 which is mounted internally of the pump structure and which has connected to it a lever member 298 (FIG. 2) which projects beyond the housing of pump 10A but is still within the confines of assembly 10. Swash plate 17 bears against the ends of the linearly movable pistons within pump 10A, the angular position of swash plate 17 determining the linear displacement of the pistons and hence determining the hydraulic output flow and pressure of pump 10A. Swash plate 17 is pivotally movable about a pivot point 301. The lower or outermost end of lever 298 connected to swash plate 17 is pivotally connected at point 304 to a linearly movable connecting rod member 306 which projects into the interior of a cylinder generally indicated at 308. The extreme end of connecting rod 306 lying within cylinder 308 is secured to a piston-like member 310. A spring member 312 is positioned within cylinder 308 between the inside surface of the left-hand end wall 314 of cylinder 308 (relative to FIG. 2), the opposite end of spring 312 bearing against the left-hand surface relative to the view of FIG. 2 of piston 310. It can thus be seen that spring member 312 tends to urge piston 310 to the extreme right-hand end of cylinder 308 relative to the view of FIG. 2.

In the view shown in FIG. 2, swash plate 17 is shown in substantially a neutral position, corresponding to a minimal output pressure and flow or "stand-by" mode of operation of pump 10A, and in this substantially neutral position, as shown in FIG. 2, piston 310 is located at an intermediate location approximately half way the length of cylinder 308. In the view of FIG. 2, if spring 312 were not resisted by a counterhydraulic force as will be explained, the natural tendency of spring 312 would be to move piston 310 to the extreme righthand end, relative to the view of FIG. 2, of cylinder 308, in so doing, pivotally moving swash plate 17 about its pivot point 301 in a counterclockwise direction relative to the view in FIG. 2, in which swash plate 17 would be at its maximum tilted position in a counterclockwise direction, such position corresponding to maximum pressure and flow output from variable displacement pump 10A.

The compensator portion of the variable displacement pump and compensator assembly generally indicated at 10 includes a low pressure valve spool generally indicated at 300, and a high pressure valve spool generally indicated at 350. As will be explained more fully, the low pressure valve spool 300 functions to maintain a relatively low output pressure such as 300 pounds per square inch, for example, in pump output conduit 22 when all open center and closed center hydraulic circuit functions are in neutral, whereby the pump during such period can operate in a "standby" mode with relatively little input power being supplied to the pump and with relatively low wear and tear on pump 10A. Low pressure valve spool 300 also serves to maintain additional pump output pressure for the open center hydraulic circuit when the open center hydraulic circuit is not in neutral position, but is being used for a steering operation, for example.

High pressure valve spool 350 functions to maintain a predetermined high pressure such as 3,000 pounds per square inch, for example, in output line 22 of pump 10A when there is a demand for hydraulic fluid flow in the closed center hydraulic system, as evidenced by energization of the solenoid valve 200 in the second pilot circuit 201 as will be hereinbefore explained.

Low pressure valve spool 300 has two forces applied to the right-hand end thereof relative to the view shown in FIG. 2 as follows:

1. a hydraulic pilot signal from the first pilot circuit and having a magnitude equal to the hydraulic pressure in conduit 34 of the open center hydraulic circuit. This first pilot circuit as seen in FIGS. 1 and 2 is connected to conduit 34 of the open center hydraulic circuit at junction 62, and thence passes through check valve 65 and conduits 60 and 206 to control signal input point 64 of assembly 10, from whence the pilot hydraulic pressure signal from the open center hydraulic circuit passes via conduit 206A (FIG. 2) to the right-hand end of low pressure valve spool 300. When both the open center and closed center hydraulic circuits are in neutral condition, as seen in FIG. 1 of the drawings, the magnitude of the hydraulic pilot signal of the first pilot circuit as just described, and communicated to the righthand end of low pressure valve spool 300 would typically normally be of the order of magnitude of 100 pounds per square inch.

It might be mentioned at this point that when only the open center hydraulic circuit is active (the closed center hydraulic circuit being in neutral), that due to the hydraulic losses in flow divider 20 occasioned by providing the constant priority flow by flow divider 20 to the open center circuit, the hydraulic pressure in the open center circuit measured at junction 62 of conduit 34 and communicated through the first pilot circuit 59 to the right-hand end of low pressure valve 300, as just described, is always typically approximately 200 pounds per square inch less than the hydraulic pressure at the same moment at the output port 14 of pump 10A and in the hydraulic output conduit 22 of pump 10A. In other words, as far as the open center hydraulic circuit is concerned, there is an inherent hydraulic loss in the flow divider 20 which causes the hydraulic pressure in the open center hydraulic circuit to always be substantially 200 pounds per square inch less than the hydraulic pressure at the same moment in hydraulic conduit 22. This statement just applies to the hydraulic pressure in the open center circuit, since the hydraulic pressure in the output conduit 100 from flow divider 20 to the closed center system is substantially unaffected by passage through the flow divider 20, and hence the hydraulic pressure in conduit 100 is substantially the same as the hydraulic pressure in output conduit 22 of pump 10A.

(2) a second force which is applied to the right-hand end of low pressure valve spool 300 as viewed in FIG. 2 is the spring 309 which in the present instance exerts a force of 200 pounds per square inch urging valve spool 300 to the left, relative to the view of FIG. 2. The pressure in pounds per square inch exerted by spring 309 against the right-hand end of low pressure valve spool 300 should be equal to the pressure loss incurred by the hydraulic fluid for the open center circuit (conduit 34) during its passage through flow divider 20 so as to compensate for the presence loss just described. Thus, in the example just given, since the pressure loss of the hydraulic fluid passing through flow divider 20 to the open center circuit was given as 200 pounds per square inch, the pressure of compensating spring 309 should be of the same magnitude, namely 200 pounds per square inch.

A pilot line 307 is connected to pump output conduit 22 at junction 305 and communicates a hydraulic pressure signal to the left-hand end, relative to FIG. 2, of low pressure valve spool 300, such signal having a magnitude corresponding to the hydraulic pressure in pump output conduit 22 at any given moment.

In the example just given, when only the open center hydraulic circuit is activated, and whether or not the open center circuit is in neutral or is performing a steering operation, pump 10A constantly strives to provide a hydraulic pressure at pump output port 14 and in pump output conduit 22 which is 200 pounds per square inch higher than the hydraulic pressure sensed by the first pilot circuit 59 at junction 62 of conduit 34 in the open center hydraulic circuit.

DESCRIPTION OF OPERATION OF COMPENSATOR DURING "STANDBY" MODE OF OPERATION

When all functions in both the open center hydraulic circuit and in the closed center hydraulic circuit are in neutral, as previously explained, pump 10A can operate in a "standby" mode of operation and maintain a relatively low output pressure in pump output conduit 22, such as 300 pounds per square inch, for example, with consequent low energy input to the pump and with relatively little "wear and tear" on pump 10A. During the "standby" mode of operation, low pressure valve spool 300 cooperates with the spring biased actuating mechanism for swash plate 17 to maintain swash plate 17 at substantially a neutral position, such as that shown in FIG. 2, in which the desired "standby" pressure such as 300 pounds per square inch is maintained in pump output conduit 22. If the pressure in pump output conduit 22 exceeds the predetermined desired value of 300 pounds per square inch for the standby operation, low pressure valve spool 300 is moved rightwardly by the pressure in pilot line 307 substantially to the position shown in FIG. 2 in which oil is passed from pump output conduit 22 at junction 314, through passage 316 in valve 300 (as seen in FIG. 2), and thence through conduit 318 to admit oil into space 308A of cylinder 308, to thereby move swash plate 17 in a clockwise or "destroking" direction in which it reduces the output pressure of pump 10A to approach the predetermined desired "standby" value of 300 pounds per square inch.

On the other hand, if the pressure in pump output conduit 22 diminishes below the desired predetermined value of 300 pounds per square inch for "standby" operation, the low pressure valve spool 300 moves in a direction to the left relative to its position as shown in FIG. 2, to a position in which passage 320 of valve 300 connects passages 318 and 322, thereby draining cylinder portion 308A to sump 18 through conduits 318, 322 and 324 in series with passage 325 in high pressure valve spool 350 which under the "standby" condition being described is in the position shown in FIG. 2. By thus connecting cylinder portion 308A to sump 18, the force of spring 312 causes swash plate 17 to move in a counterclockwise or "stroking" direction relative to the view in FIG. 2 to thereby restore the output pressure in output conduit 22 to its predetermined "standby" value of substantially 300 pounds per square inch.

Thus it can be seen that under "standby" operation, when all open center and closed center functions are in neutral, the low pressure valve spool 300 functions to stabilize the output pressure in pump output conduit 22 at the desired predetermined value such as 300 pounds per square inch.

Assume now that the steering wheel in the open center hydraulic circuit of FIG. 1 is turned to impart a steering action to the vehicle such as a combine. Assume also that the closed center hydraulic circuit is still in neutral condition with no hydraulic flow therein, and that solenoid valve 200 thus remains unenergized. During the steering operation caused by rotation of the steering wheel controlling pump 36, the pressure in the open center circuit may now increase substantially from a value such as 100 pounds per square inch which is typical of the pressure condition under the neutral condition of the open center circuit, to some value in the range, for example, of 400 to 1,000 pounds per square inch depending upon various conditions such as the terrain over which the vehicle is moving, etc. In fact, under extreme circumstances, the pressure during steering operation in the open center circuit may even reach an extreme condition such as 2,000 pounds per square inch as, for example, if the vehicle gets caught in a rut, in which case saftey valve 66 (FIG. 1) previously described will provide a relief to sump 18 as previously described.

The higher pressure sensed by the first pilot circuit 59 at junction 62 of conduit 34 in the open center circuit will be transmitted to the right-hand end of low pressure valve spool 300, relative to the view of FIG. 2, as previously explained, and this increased pressure will also be supplemented by the 200 pounds per square inch pressure exerted by spring 309. The combined pressures from the first pilot circuit and from spring 309 acting on the right-hand end of low pressure valve spool 300 will shift valve spool 300 to the left relative to the position shown in FIG. 2 to a position in which passage 320 of low pressure valve spool 300 will bridge conduits 318 and 322 to drain hydraulic fluid through passage 325 of high pressure valve spool 350, and through conduit 324, from cylinder section 308A to sump. This will permit swash plate 17 to "stroke," moving in a counterclockwise direction, relative to the view of FIG. 2, to increase the output pressure in pump output line 22. This increased pressure in pump output conduit 22 will be transmitted through pilot conduit 307 to the left-hand end of low pressure valve spool 300. The forces acting upon the opposite ends of valve spool 300 will reach an equilibrium position in which the angular position of swash plate 17 will be such as to cause variable displacement pump 10A to deliver to pump output conduit 22 hydraulic fluid at the increased pressure level required for the steering operation in the open center circuit.

CLOSED CENTER OPERATION OF COMPENSATOR

Assume now that one of the solenoids such as 122, 124, 132, 134, 138, 144 or 148 is energized to demand hydraulic flow in the fluid flow divider output conduit 100 which supplies hydraulic fluid to the closed center hydraulic system. As previously explained, energization of any one of these solenoids will simultaneously energize solenoid valve 200 in the second pilot circuit 201

(FIGS. 1 and 2). Energization of solenoid valve 200 will immediately connect the hydraulic pressure in flow divider output line 100 via junction 204, through solenoid valve 200 and conduit 206 to input control point 64 of assembly 10, from whence the hydraulic pressure from conduit 100 will be conveyed via conduit 206A to the right-hand end of low pressure valve spool 300. At the moment solenoid 200 is energized as just described, the pressure in conduit 100 should be at least 300 pounds per square inch, corresponding to at least the "standby" pressure maintained in pump output conduit 22. This hydraulic pressure transmitted from junction 204 of conduit 100 to the right-hand end the low pressure valve 300, and supplemented by the force of spring 309, will be sufficient to move low pressure valve 300 to an extreme left-hand position relative to its position in FIG. 2, in which passage 320 of valve spool 300 will interconnect conduits 318 and 322, thereby connecting cylinder portion 308A to sump 18, through passage 325 of high pressure valve spool 350 in its FIG. 2 position and through conduit 324 (FIG. 2). Low pressure valve spool 300 will remain in the position just described in which valve passage 320 connects conduits 318 and 322 as long as solenoid valve 200 remains energized.

With cylinder portion 308A connected to sump 18 as just described, substantially all of the oil in cylinder portion 308A will be drained to sump 18, permitting spring 312 to "stroke" swash plate 17 to its extreme counterclockwise position relative to the view of FIG. 2, thereby increasing the pump output pressure in pump output line 22 to a predetermined desired value such as 3,000 pounds per square inch, for example.

The high pressure valve spool 350 serves to maintain the output pressure in pump output conduit 22 at the predetermined desired pressure of 3,000 pounds per square inch in the following manner: It will be noted that the pilot conduit 352 (FIG. 2) is connected to pump output conduit 22 at junction 354 and communicates the pressure in pump output conduit 22 to the right-hand end of high pressure valve spool 350 relative to FIG. 2. A spring 356 bears against the opposite or left-hand end of high pressure valve spool 350 relative to FIG. 2. When the pressure in pump output conduit 22 exceeds the predetermined desired value such as 3,000 pounds per square inch, the hydraulic pressure in pilot conduit 352 will cause high pressure valve spool 350 to move to the left relative to the view of FIG. 2 against the force of spring 356 to permit high pressure oil to pass from junction 358 of conduit 22 through valve passage 325 in its shifted position, through conduit 327, to junction 360 of conduit 318, from whence the high pressure oil will flow into cylinder portion 308A to "destroke" swash plate 17, thereby reducing the pressure output in pump output conduit 22 which has exceeded the desired value of 3,000 pounds per square inch, and restoring the hydraulic pressure in pump output conduit 22 to substantially 3,000 pounds per square inch. If the pressure in pump output line 22 drops a measurable amount below the predetermined desired value of 3,000 pounds per square inch, spring 356 acting on the left-hand end of high pressure valve spool 350 will move valve spool 350 to the right, relative to FIG. 2, back to the position shown in FIG. 2 in which cylinder portion 308A is again connected to sump 18 through conduits 318, 322, passage 320 of low pressure valve spool 300, through passage 325 of high pressure valve spool 350 and conduit 324, thereby permitting oil in cylinder portion 308A to flow back to sump. This, in turn, will permit swash plate 17 to again move in a counterclockwise or "stroking" direction relative to FIG. 2 thereby acting in a manner to restore the pressure in pump output line 22 to its predetermined desired value % 3,000 pounds per square inch.

It will thus be seen that once solenoid valve 200 has been energized by demand for hydraulic fluid flow in the closed center hydraulic system that the high pressure valve spool 350 will stabilize the pump output pressure in output conduit 22 at a predetermined desired high pressure such as 3,000 pounds per square inch.

When solenoid valve 200 is energized as just described to cause pump 10A to have a high pressure hydraulic output such as 3,000 pounds per square inch, this high pressure hydraulic output is delivered to the pressure compensated flow divider 20 in the same manner as previously described, and the flow divider 20 continues to insure a constant priority flow of a predetermined volume such as 3.5 gallons per minute to the open center circuit, regardless of whether the open center circuit is in neutral position as shown in FIG. 1 or is in steering position.

It should be noted that once the second pilot circuit 201 has been completed by the energization of solenoid valve 200, as previously described, to cause the output pressure of pump 10A to be maintained at a substantially higher pressure, such as 3,000 pounds per square inch, the first pilot circuit 59 which monitors the hydraulic pressure in the open center hydraulic circuit is superseded for as long as solenoid 200 remains energized, and the second pilot circuit 201 including solenoid valve 200 in effect "takes over."

When pump 10A is operating at its higher pressure range, such as 3,000 pounds per square inch, the open center circuit continues to receive its priority minimum flow such as 3.5 gallons per minute through the pressure compensated flow divider 20. Under these conditions, if the open center circuit is in neutral, this priority hydraulic flow will be delivered to the open center circuit at a low pressure such as 100 pounds per square inch, due to the action of flow divider 20, despite the fact that pump 10A is delivering fluid to the input port 15 of flow divider 20 at a hydraulic pressure such as 3,000 pounds per square inch.

When pump 10A is delivering hydraulic fluid at its higher pressure range of 3,000 pounds per square inch, any additional hydraulic pressure required by the open center circuit above the 100 pounds per square inch pressure corresponding to the neutral condition of the open center circuit, as for example, when the steering wheel is rotated to initiate a steering action, will be available at the outlet port 26 of flow divider 20 leading to the open center circuit, due to the high hydraulic pressure being delivered to the input port 15 of the flow divider.

As previously explained, when the steering wheel is performing a steering operation, the hydraulic pressure requirement in the open center circuit may, for example, be in the range of 400 to 1,000 pounds per square inch. However, the hydraulic pressure in the open center circuit can never exceed the predetermined value at which relief valve 66 (FIG. 1) is set, such as 2,000 pounds per square inch.

The pump 10A typically may be capable of producing a maximum output hydraulic flow from pump outlet port 14 of 25 gallons per minute when the pump is operating at its maximum pressure output of 3,000 pounds per square inch.

It should also be noted that the angular position of swash plate 17 for any given pressure and flow output of pump 10A will vary as a function of the speed of the prime mover which is driving pump 10A. As previously mentioned, such a prime mover may be a power take-off from the engine which drives an agricultural vehicle such as a combine. In other words, to effect a given output of pump 10A a different angular position of swash plate 17 may be required for one speed of pump rotation than for another speed of pump rotation in order to deliver the same output flow, since if the speed of rotation of the pump decreases, the linear stroke of the reciprocating pistons of the pump must be increased to deliver the same pump output flow and pressure, thereby requiring a different angular position of the swash plate 17. However, this factor does not affect the regulation or the operation of the system as hereinbefore described.

DESCRIPTION OF THE HYDRAULIC OPERATION OF THE CLOSED CENTER HYDRAULIC CIRCUITRY AND HYDRAULIC DEVICES ASSOCIATED THEREWITH

Description of Hillside Leveling Rams and Associated Control Circuitry

The hillside leveling rams 102 and 104 (FIG. 1) are used for the purpose of leveling the portion of the self-propelled combine lying above axle level, in a situation where the combine is moving along an incline such as a hillside. The ram generally indicated at 102 includes a cylinder 103 and a piston 105 which is linearly movable in cylinder 103. The leveling ram generally indicated at 104 includes a cylinder 107 and a piston 109 linearly movable in cylinder 107. To accomplish leveling operation, the hydraulic circuitry associated with leveling rams 102 and 104 is so connected and operative as to move the pistons 105 and 109 in opposite directions to perform a leveling operation for a given direction of inclination of the hillside on which the combine is located.

Assume that the combine is on an incline such that it is necessary to move piston 105 of ram 102 to the left relative to the view shown in FIG. 1 and to simultaneously move piston 109 of ram 104 to the right relative to the view in FIG. 1 to provide the required leveling operation. In order to accomplish this, solenoid valve 122 which is shown in its closed position in the view of FIG. 1 is energized by means of push button switch 210 (FIG. 3) to thereby move solenoid valve 122 to an open position. Movement of solenoid valve 122 to its "open" position provides a hydraulic flow from flow divider output line 100 through solenoid valve 122 to the input of control valve generally indicated at 120 in such manner as to shift control valve 120 to the right relative to the view shown in FIG. 1 to a position in which the respective valve passages A and B of control valve 120 are respectively connected to conduits 250 and 252. In this open position of control valve 120, just described, conduit 250 is connected through valve passage A to flow divider hydraulic output line 100 in series with a flow restriction 254. At the same time, conduit 252 is connected through valve passage B and line 101A to sump line 101.

With conduit 250 connected to the source of hydraulic pressure flow from flow divider output line 100, it can be seen that hydraulic flow will enter cylinder 103 of ram 102 through check valve 111A and will cause piston 105 to move to the left relative to the schematic diagram of FIG. 1. At the same time, hydraulic fluid from line 250 will enter via line 250A into the left-hand end, relative to the view of FIG. 1, of cylinder 107 of ram 104, causing piston 109 to move to the right relative to the view of FIG. 1. During this period, check valve 111B associated with ram 104 will be disabled by the pilot circuit indicated at 250C, permitting hydraulic fluid on the right-hand side of piston 109 of ram 104 relative to the view of FIG. 1, to pass outwardly into exhasut line 252 and thence through passage B of control valve 120 to sump line 101. During the movement of piston 105 of ram 102 to the left as previously described, hydraulic fluid is exhausted on the left-hand side of piston 105, relative to the view of FIG. 1, through conduit 252A and thence to conduit 252, from whence it is exhausted to sump line 101. Thus, when solenoid valve 122 is energized as just described, it causes piston 105 of ram 102 to move to the left relative to the view of FIG. 1 and causes piston 109 of ram 104 to move to the right relative to the view of FIG. 1. Thus, rams 102 and 104 cooperate in the leveling operation of the combine for a given inclination of the hillside or incline on which the combine or other agricultural machine is located.

Assume now that the agricultural machine such as the combine is located on an incline having an opposite direction of inclination from that which prevailed during the previously described operation of rams 102 and 104, and that in order to properly level the combine, it is necessary to move piston 109 of ram 104 to the left relative to the view of FIG. 1 and to move piston 105 of ram 102 to the right relative to the view of FIG. 1. If this situation prevails, solenoid valve 124 is energized by operation of push button switch 210-1, to move solenoid valve 124 from its normally closed position shown in FIG. 1 to its open position in which hydraulic fluid passes through solenoid valve 124 from flow divider output line 100. The hydraulic fluid thus passing through solenoid valve 124 pushes control valve 120 to the left relative to the view shown in FIG. 1 to a position in which valve passage C of control valve 120 passes hydraulic fluid in series with flow restrictor 254 into conduit or line 252 from fluid divider output line 100, and in which passage D of control valve 120 exhausts hydraulic fluid from conduit 250 through control valve 120 to sump line 101. When this latter condition prevails, hydraulic fluid passes through conduit 252 and enters cylinder 107 of ram 104 past check valve 111B in such manner as to push piston 109 to the left relative to the view of FIG. 1. When piston 109 of ram 104 moves to the left as just described, hydraulic fluid lying to the left of piston 109 is exhausted through conduits 250A, 250, passage D of control valve 120, and conduit 101A to sump line 101. Simultaneously, the pressurized hydraulic fluid from conduit 252 passes through conduit 252A into the left-hand end of cylinder 103 of ram 102 relative to the view of FIG. 1, causing movement of piston 105 of ram 102 to the right relative to the view of FIG. 1. Simultaneously therewith, pilot pressure through pilot conduit 252C disables check valve 111A, permitting hydraulic fluid to exhaust from the right-hand side of piston 105, relative to the view of FIG. 1, the hydraulic fluid thus exhausted passing through conduit 250 and passage D of control valve 120, and via conduit 101A, back to sump line 101.

Auger Position Control Ram

The auger position control ram 106 is hydraulically controlled by a normally closed (i.e., closed to hydraulic flow) pilot valve generally indicated at 130 which may be selectively moved to either of two possible open positions under the influence of normally closed solenoid valves 132 and 134 respectively. When solenoid valve 132 is electrically energized by actuation of push button switch 210-2, (FIG. 3), hydraulic fluid passes from flow divider output line 100 through solenoid valve 132 and moves control valve 130 to the right, relative to the view shown in FIG. 1, to permit control valve 130 to pass hydraulic fluid through passage E thereof into line 260 and thence into the right-hand end of auger position control ram cylinder 106A, relative to FIG. 1, thus advancing piston 106B to the left, relative to FIG. 1. In this position of control valve 130, hydraulic fluid is exhausted through conduit 262 from the left-hand side of piston 106B, relative to the view of FIG. 1, through passage F of control valve 130, and thence to sump line 101.

If it is desired to move piston 106B of auger position control ram 106 to the right, relative to FIG. 1, solenoid valve 134 is electrically energized by push button switch 210-3 (FIG. 3). Energization of solenoid valve 134 passes hydraulic fluid through solenoid valve 134 from flow divider output line 100 to move control valve 130 to the left relative to FIG. 1, to a position in which passage G of control valve 130 passes hydraulic fluid from flow divider output line 100 into conduit 262, thereby admitting fluid into the left-hand end of ram cylinder 106A, to thereby move piston 106B to the right, relative to FIG. 1. Simultaneously therewith,, hydraulic fluid is exhausted from the right-hand end of ram cylinder 106A into conduit 260, from whence it passes through passage H of control valve 130 to sump line 101.

HEADER HEIGHT CONTROL RAM

1. Upward Movement Mode of Operation

The header height control ram 108 is controlled for its elevating or upward movement mode of operation by a solenoid valve 138 and a control valve 136. When it is desired to elevate piston 108B of ram 108, solenoid valve 138 is energized by push button switch 210-4 (FIG. 3) to move solenoid valve 138 to a position in which it passes hydraulic fluid from flow divider output line 100 to control valve 136 in such manner as to move control valve 136 to a position (i.e., to the right in FIG. 1) in which hydraulic flow is communicated from flow divider output line 100, through passage J of control valve 136, through one way check valve 137, into conduit 139 which delivers hydraulic fluid into the interior of ram cylinder 108A beneath ram piston 108B to thereby impart an elevating movement to piston 108B of header height control ram 108.

2. Downward Movement Mode of Operation

If it is desired to move header height control ram piston 108B in a downward direction, solenoid valve 140 is energized by push button control switch 210-7 of FIG. 2. Energization of solenoid valve 140 communicates hydraulic fluid from conduit 139 leading from ram cylinder 108A, thence through solenoid valve 140 in its energized or "open" position, to cause movement of the associated control valve 142 to the right relative to the view of FIG. 1. This movement of control valve 142 places conduits 139, 139A, in series with valve passage K of control valve 142, permitting hydraulic fluid to exhaust from ram cylinder 108A to sump line 101, to permit descending movement of ram piston 108B.

REEL SPEED CONTROL RAM

The reel speed control ram generally indicated at 110 (FIG. 1) includes a cylinder 110A and a piston 110B movable in the cylinder. To control upward movement of piston 110B relative to the view shown in FIG. 1, solenoid valve 144 is energized by closure of push button switch 210-5 (FIG. 3). Energization of solenoid valve 144 causing movement of valve 144 to a position in which valve passage L passes hydraulic fluid from conduit 100 to the interior of cylinder 110A to raise piston 110B relative to the view of FIG. 1.

In order to lower piston 110B of reel speed control ram 110, relative to the view shown in FIG. 1, solenoid valve 146 is energized by closure of push button switch 210-8 (FIG. 3) to thereby place the interior of ram cylinder 110A beneath piston 110B in hydraulic communication with sump line 101, thereby permitting hydraulic fluid to exhaust from cylinder 110A, and permitting reel speed control ram piston 110B to descend relative to the view of FIG. 1.

In addition to electrically energizing solenoid valve 146 to move valve 146 to its open position, as just described, solenoid valve 146 may also be moved to its open position by the application of hydraulic force through hydraulic pilot line 147 which is responsive to the hydraulic pressure inside cylinder 110A. When a predetermined hydraulic pressure is sensed in pilot line 147, solenoid valve 146 will be moved to the right relative to the view of FIG. 1, to thereby connect to sump line 101 the interior of ram cylinder 110A beneath piston 110B, to permit descending movement of piston 110B.

TRACTION DRIVE REEL LIFT RAM

The traction drive reel lift ram 112 (FIG. 1) comprises a ram cylinder 112A and a piston 112B movable in cylinder 112A. A solenoid valve generally indicated at 148 when energized by closure of push button switch 210-6 (FIG. 3) permits flow of hydraulic fluid from flow divider output line 100 into cylinder 112A beneath piston 112B, to cause elevating movement (relative to the view of FIG. 1) of piston 112B.

When it is desired to lower piston 112B in cylinder 112A relative to the view of FIG. 1, solenoid valve 150 is energized by closure of push button switch 210-9 (FIG. 3) to connect the lower end of cylinder 112A to sump line 101, thereby permitting piston 112B to lower in ram cylinder 112A, relative to the view of FIG. 1.

From the foregoing detailed description of the invention, it has been shown how the objects of the invention have been obtained in a preferred manner. However, modifications and equivalents of the disclosed concepts such as readily occur to those skilled in the art are intended to be included within the scope of this invention.

The embodiments of the invention in which an exclusive property or privilege is claimed are defined as follows:

1. In a hydraulic system, the combination comprising a variable displacement pump, said pump including a hydraulically actuated stroke control means which may be actuated to vary the displacement of said pump, said pump including an inlet through which hydraulic fluid is admitted to said pump, said pump including an outlet through which hydraulic fluid is discharged from said pump, a flow divider having an inlet connected to said outlet of said pump, said flow divider having first and second outlets, said flow divider being operable to divide the pump flow to said first and said second outlets, with said first outlet receiving a priority constant magnitude flow, an open center hydraulic circuit connected to said first outlet whereby to receive said priority constant magnitude flow, a closed center hydraulic circuit connected to said second outlet, a first pilot circuit responsive to the pressure condition in said open center hydraulic circuit and operatively connected to said hydraulically actuated stroke control means whereby to vary the condition of said hydraulically actuated stroke control means as a function of the pressure condition in said open center hydraulic circuit, and a second pilot circuit operatively connectable to said hydraulically actuated stroke control means, whereby to vary the condition of said hydraulically actuated stroke control means, and means effective to operatively connect said second pilot circuit to said hydraulically actuated stroke control means only when there is a demand for hydraulic fluid flow from said second outlet to said closed center hydraulic circuit.

2. A hydraulic system as defined in claim 1 in which said flow divider is pressure compensated, whereby to provide a constant magnitude hydraulic flow rate at said first outlet despite variations in the output hydraulic pressure of said pump.

3. A hydraulic system as defined in claim 1 in which said control of said hydraulically actuated stroke control means by said first pilot circuit is superseded by said second pilot circuit when said second pilot circuit is operatively connected to said hydraulically actuated stroke control means upon a demand for hydraulic flow in said closed center hydraulic circuit.

4. A hydraulic system as defined in claim 1 in which said first pilot circuit is normally in control of said hydraulically actuated stroke control means for a substantially higher precentage of the duty cycle of said pump than the percentage of the duty cycle of said pump in which said second pilot circuit is in control of said hydraulically actuated stroke control means.

5. A hydraulic system as defined in claim 1 in which said priority constant flow to said open center hydraulic circuit is of constant flow rate magnitude despite variations in the hydraulic output pressure of said pump.

6. A hydraulic system as defined in claim 1 in which said open center hydraulic circuit is utilized in the steering system of a vehicle.

7. A hydraulic system as defined in claim 1 in which said variable displacement pump includes at least one axially reciprocable piston, and in which said hydraulically actuated stroke control means comprises a tiltably movable swash plate which bears against said piston to control the stroke of said piston and thus to control the hydraulic output of said piston.

8. A hydraulic system as defined in claim 7 in which said tiltably movable swash plate is normally spring biased toward a maximum tilt position corresponding to a maximum output pressure of said pump, and said hydraulically actuated stroke control means includes means acting under supervision of one of said pilot circuits to control the degree of hydraulic force acting against the spring bias on said tiltably movable swash plate whereby to control the tilt position of said swash plate.

9. A hydraulic system as defined in claim 1 in which said closed center hydraulic circuit comprises at least one hydraulically operated device which is connectable in hydraulic flow relation to said second outlet of said flow divider, and in which activation of said at least one hydraulically operated device to hydraulically connect said at least one device to said second outlet will operatively connect said second pilot circuit to said hydraulically actuated stroke control means whereby to substantially increase the pressure output of said pump to satisfy the hydraulic pressure requirements of said closed center hydraulic circuit.

10. A hydraulic system as defined in claim 9 in which a plurality of hydraulically operated devices in said closed center hydraulic circuit are connectable in hydraulic flow relation to said second outlet of said flow divider, and in which activation of any one of said hydraulically operated devices to hydraulically connect said any one device to said second outlet will operatively connect said second pilot circuit to said hydraulically actuated stroke control means, whereby to substantially increase the pressure output of said pump to satisfy the hydraulic pressure requirements of said closed center hydraulic circuit.

11. A hydraulic system as defined in claim 1 in which said second pilot circuit includes a solenoid valve, and said solenoid valve is energized to complete said second pilot circuit in response to a demand for hydraulic fluid flow in said closed center hydraulic circuit from said second outlet of said flow divider.

12. A hydraulic system as defined in claim 11 in which said solenoid valve is energized in response to said activation of any one of said hydraulically operated devices of said closed center hydraulic circuit to demand hydraulic fluid flow from said second outlet of said flow divider.

13. In a hydraulic system, the combination comprising a variable displacement pump, said pump including a hydraulically actuated stroke control means which may be activated to vary the displacement of said pump and hence the output pressure of the pump, said pump including an inlet through which hydraulic fluid is admitted to said pump, said pump including an outlet through which hydraulic fluid is discharged from said pump, a flow divider having an inlet connected to said outlet of said pump, said flow divider having first and second outlets, said flow divider being operable to divide the pump flow to said first and said second outlets, with said first outlet receiving a priority constant flow, an open center hydraulic circuit connected to said first outlet whereby to receive said priority constant flow, a closed center hydraulic circuit connected to said second outlet, said pump being adapted to operate in a "standby" mode at relatively low hydraulic output pressure from said pump with consequent relatively low energy input to said pump and with relatively low "wear and tear" on said pump when all functions of said open center hydraulic circuit and of said closed center hydraulic circuit are in neutral, a first pilot circuit responsive to the pressure condition in said open center hydraulic circuit and operatively connected to said hydraulically actuated stroke control means whereby to vary the condition of said hydraulically actuated stroke control means as a function of the pressure condition in said open center hydraulic circuit, and a second pilot circuit operatively connectable to said hydraulically actuated stroke control means, whereby to vary the condition of said hydraulically actuated stroke control means, and means effective to operatively connect said second pilot circuit to said hydraulically actuated stroke control means only when there is a demand for hydraulic fluid flow from said second outlet to said closed center hydraulic circuit.

14. A hydraulic system as defined in claim 13 in which operative connection of said second pilot circuit to said hydraulically actuated stroke control means is effective to cause said pump to have a substantially higher hydraulic output pressure than during the "standby" mode of operation of said pump.

15. A hydraulic system as defined in claim 14 in which said hydraulically actuated stroke control means includes means to maintain the hydraulic output pressure of said pump constantly at substantially said higher hydraulic output pressure while said second pilot circuit is operatively connected to said hydraulically actuated stroke control means.

16. A hydraulic system as defined in claim 1 including means for cooling and filtering the hydraulic fluid flowing in said hydraulic system, whereby hydraulic fluid delivered to both said open center hydraulic circuit and to said closed center hydraulic circuit is cooled and filtered.

* * * * *